US012536187B2

(12) United States Patent
Raman

(10) Patent No.: US 12,536,187 B2
(45) Date of Patent: Jan. 27, 2026

(54) COMPUTER SYSTEMS FOR FRACTAL ANALYSIS, INTERACTION, AND VISUALIZATION OF QUALITATIVE AND QUANTITATIVE DATA

(71) Applicant: CAARMO Holdings, Inc., Apex, NC (US)

(72) Inventor: Vinay Raman, Apex, NC (US)

(73) Assignee: CAARMO Holdings, Inc., Apex, NC (US)

( * ) Notice: Subject to any disclaimer, the term of this patent is extended or adjusted under 35 U.S.C. 154(b) by 0 days.

(21) Appl. No.: 18/774,275

(22) Filed: Jul. 16, 2024

(65) Prior Publication Data

US 2025/0028727 A1    Jan. 23, 2025

Related U.S. Application Data

(60) Provisional application No. 63/528,248, filed on Jul. 21, 2023.

(51) Int. Cl.
*G06F 16/00* (2019.01)
*G06F 16/242* (2019.01)
*G06F 16/248* (2019.01)
*G06F 16/25* (2019.01)

(52) U.S. Cl.
CPC ........ *G06F 16/248* (2019.01); *G06F 16/2428* (2019.01); *G06F 16/258* (2019.01)

(58) Field of Classification Search
CPC .............................. G06F 16/00; G06F 16/248
See application file for complete search history.

(56) References Cited

U.S. PATENT DOCUMENTS

| | | | |
|---|---|---|---|
| 7,409,357 B2 | 8/2008 | Schaf et al. | |
| 7,698,188 B2 | 4/2010 | Hollas et al. | |
| 7,899,756 B2 | 3/2011 | Rizzolo et al. | |
| 9,811,794 B2 | 11/2017 | Mun | |
| 10,095,990 B2 | 10/2018 | Farooq et al. | |
| 10,891,263 B2 * | 1/2021 | Kuchoor | G06F 16/1873 |
| 11,514,517 B2 | 11/2022 | Coulter | |

(Continued)

OTHER PUBLICATIONS

Beisheim et al., KeyPerformance Indicators for Design and Engineering, Concurrent Engineering Approaches for Sustainable Product Development in a Multi-Disciplinary Environment, Springer-Verlag, pp. 341-342. (Year: 2013).*

(Continued)

*Primary Examiner* — Cheryl Lewis
(74) *Attorney, Agent, or Firm* — NEO IP

(57) ABSTRACT

The present invention is a computer system for creating fractal spider graphs which display data in a nested structure. The present invention includes a data store, a data analytics engines, and a computer platform for data visualization. The present invention analyzes both qualitative and quantitative data to determine a pattern of behavior based on the data. The data is then broken down into key performance indicator (KPI) units using NLP and machine learning. These KPI units are then used as the atomic unit for constructing the fractal spider graphs. The fractal spider graphs of the present invention are hierarchical, nested spider graphs which simultaneously display information and analysis from multiple levels of an organizational hierarchy.

20 Claims, 9 Drawing Sheets

(56) References Cited

U.S. PATENT DOCUMENTS

| | | |
|---|---|---|
| 2001/0027455 A1 | 10/2001 | Abulleil et al. |
| 2003/0033179 A1 | 2/2003 | Katz et al. |
| 2009/0113427 A1 | 4/2009 | Brady et al. |
| 2012/0004946 A1 | 1/2012 | Blackwood et al. |
| 2014/0019194 A1 | 1/2014 | Anne |
| 2014/0289386 A1 | 9/2014 | Vatto et al. |
| 2022/0027826 A1 | 1/2022 | Makhija et al. |
| 2022/0164736 A1 | 5/2022 | Johnson |
| 2022/0343444 A1 | 10/2022 | Chan et al. |

OTHER PUBLICATIONS

Rania Soussi, "SPIDER-Graph: A Model for Heterogeneous Graphs Extracted from a Relational Database," Springer-Verlag, pp. 543-552. (Year: 2012).*

* cited by examiner

COMPUTER SYSTEMS FOR FRACTAL ANALYSIS, INTERACTION, AND VISUALIZATION OF QUALITATIVE AND QUANTITATIVE DATA

CROSS REFERENCES TO RELATED APPLICATIONS

This application claims priority to and the benefit of U.S. Provisional Patent Application No. 63/528,248, filed Jul. 21, 2023, which is incorporated herein by reference in its entirety.

BACKGROUND OF THE INVENTION

1. Field of the Invention

The present invention relates to computer systems for data aggregation and visualization, and more specifically to computer systems with fractal visualization of analyzed and displayed data, including qualitative and quantitative data.

2. Description of the Prior Art

It is generally known in the prior art to provide computer systems for data analysis using quantitative and qualitative data.

Prior art patent documents include the following:

US Patent Pub. No. 2009/0113427 for Program Management Effectiveness by inventors Brady et al., filed Oct. 25, 2007 and published Apr. 30, 2009, is directed to a system and method for consistently evaluating program management effectiveness against established or historical benchmarks, involving defining specific performance areas by subfactors, weighting the subfactors, scoring the subfactors, and totaling all weighted subfactor scores to obtain a performance area score. By evaluating all performance area scores, a composite score for an evaluated program may be obtained. Scores may be compared to historical values and optimized based on such values.

US Patent Pub. No. 2022/0164736 for Automated process to identify optimal conditions and practices to grow plants with specific attributes by inventor Johnson, filed Nov. 22, 2021 and published May 26, 2022, is directed to an invention which identifies the optimal genetics, environment, and management practices and predicts the probability of growing a crop with the desired attributes, quantifies the attribute, scores relative performance, and identifies actions management can take to increase probability of growing plants with specific attributes. The present invention uses an improved technique of data acquisition known as intelligent sampling. Intelligent sampling functions by identifying a minimal dataset that is used to train the model disclosed herein while still achieving acceptable accuracy.

US Patent Pub. No. 2001/0027455 for Strategic planning system and method by inventors Abulleil et al., filed Apr. 10, 2001 and published Oct. 4, 2001, is directed to a computer-implemented method for planning. The method includes assessing market attractiveness and competitiveness of an idea and planning to implement the idea. Planning to implement the idea includes predicting results based on implementation of the idea, creating a plan, and automatically re-predicting results of implementing the plan. The method also includes outputting the plan.

US Patent Pub. No. 2022/0343444 for Artificial intelligence, machine learning, and predictive analytics for patent and non-patent documents by inventors Chan et al., filed May 2, 2022 and published Oct. 27, 2022, is directed to systems, methods, and computer program methods for modifying a configuration of a document management system. In some implementation document data are received as machine learning inputs, where the document data represent one or more documents. Then, a pattern is recognized in the one or more documents using machine learning. Based on the recognized pattern, a configuration of a document management system is modified.

U.S. Pat. No. 11,514,517 for Scenario gamification to provide improved mortgage and securitization by inventor Coulter, filed Nov. 8, 2019 and issued Nov. 29, 2022, is directed to systems and processes for the gamification of data, including providing scenarios and actionable elements to execute a preferred scenario. Embodiments can include a credit modification software tool that is configured to automate the transmission of one or more messages to effectuate modification of a credit score associated with a user. The system can determine accounts eligible for improvements, application amounts, time to apply, and determine the effect on user's credit score. Embodiments can include scenarios for increasing a user's credit score where funds are not available by applying for a loan to reduce rolling debts, thereby providing a net increase credit score. Loans can be negotiated based on the resulting credit score and autonomously implement. A universal payment system is disclosed to retrieve data and determine a transaction model, which determines the accounts to be used, in which order, and how much to be applied, in order to benefit a credit score.

U.S. Pat. No. 7,698,188 for Electronic enterprise capital marketplace and monitoring apparatus and method, filed Nov. 3, 2005 and issued Apr. 13, 2010, is directed to an automated and interactive system that facilitates efficient capitalization/liquidation and monitoring of private and publicly-traded enterprises through a network-driven marketplace is disclosed. The system may be comprised of a dynamic process for enterprise characterization, a customizable computational engine that utilizes statistical reference information to quantify a multi-factor scoring value for each unique enterprise, a customizable system for investor-users to filter, rank, and screen enterprise prospects, a customizable system for monitoring the performance of enterprises, an integrated internal system for electronic communication between market participants, and an empirical feedback system that provides a dynamic knowledge base of statistical reference information for various computational components of the invention.

U.S. Pat. No. 9,811,794 for Qualitative and quantitative modeling of enterprise risk management and risk registers by inventor Mun, filed Mar. 14, 2014 and issued Nov. 7, 2017, is directed to The present invention is applicable in the field of corporate finance, corporate capital investments, economics, math, business risk analysis, simulation, decision analysis, qualitative risk analysis, risk management, quantitative risk analysis, and business statistics, and relates to the modeling and valuation of investment decisions under uncertainty and risk within all companies, allowing these firms to properly identify, assess, quantify, value, diversify, and hedge their corporate capital investment decisions and their associated risks. Specifically, the present invention looks at starting from a comprehensive qualitative risk register and moving the analysis into the realms of quantitative risk modeling, simulation, and optimization.

US Patent Pub. No. 2022/0027826 for Autonomous sourcing and category management by inventors Makhija et al., filed Jul. 24, 2020 and published Jan. 27, 2022, is directed to a method, a system and a computer program product for Autonomous sourcing and Category management. The invention includes demand sensing and generation through a category workbench interface providing actionable insights for sourcing operation. The invention includes an AI engine configured for recommending a sourcing strategy through prediction analysis and auto negotiation in sourcing operation of Supply chain.

US Patent Pub. No. 2014/0289386 for Electronic arrangement and related method for dynamic resource management by inventors Vatto et al., filed Dec. 23, 2013 and published Sep. 25, 2014, is directed to electronic arrangement for managing system resources based on user perception includes a processing entity, a memory entity, and a data transfer entity, the arrangement being configured to transmit data identifying a recurring online survey including a number of questions regarding the managed resources to a plurality of respondents each of which being associated with at least one terminal device reachable via the communications network. The arrangement customizes the survey to each respondent relative to at least one question through indication of previous answer by the user to the same question already answered in a previous round of the survey to enable the respondent to recall the previous answer and scale the current answer consistently, receive data indicative of answers to the survey questions provided by the plurality of respondents via the associated terminal devices, determine on the basis of the indicated answers a number of representative respondents from the plurality.

US Patent Pub. No. 2014/0019194 for Predictive Key Risk Indicator Identification Process Using Quantitative Methods by inventor Anne, filed Jul. 12, 2012 and published Jan. 16, 2014, is directed to methods, computer-readable media, and apparatuses are disclosed for identifying predictive key risk indicators (KRIs) for organizations and/or firms through the application of specific statistical and quantitative methods that are well integrated with qualitative adjustment. An indicator is a variable with the purpose of measuring change in a phenomena or process. A risk indicator is an indicator that estimates the potential for some form of resource degradation using mathematical formulas or models. Organization/enterprise key risk indicators are an essential arsenal in the risk management framework of any firm or organization and may be required by regulatory agencies.

US Patent Pub. No. 2012/0004946 for Integrated Operational Risk Management by inventors Blackwood et al., filed Jun. 29, 2011 and published Jan. 5, 2012, is directed systems, methods, and software are described that may be used to integrate assessments of certain types of operational risks, including forecasted emerging (future) risks, current risks, and/or historical realized risks.

U.S. Pat. No. 10,095,990 for Developing, implementing, transforming and governing a business model of an enterprise by inventor Farooq et al., filed Jan. 24, 2008 and published Jan. 27, 2022, is directed to methods and systems for developing, implementing, transforming, and governing a business model of an enterprise. In some embodiments, a method of implementing and managing a business model of an enterprise includes defining a business model using a business model tool that is executed by a computer, wherein the business model is based on interrelated business strategy, business goal and business constraint data, and includes a business service, inputting into the computer a first set of data representing a benchmark performance value of the business service, and operating the enterprise in accordance with the business model. The enterprise is monitored to determine an actual performance value of the business service, and the actual performance value and the benchmark performance value are processed in the computer to affect a comparison therebetween. The business model is modified based on the comparison.

U.S. Pat. No. 7,899,756 for Critical parameter/requirements management process and environment by inventors Rizzolo et al., filed Dec. 1, 2004 and issued Mar. 1, 2011, is directed to a critical parameter/requirements management process model for managing a development program for a product and an associated product structure-driven critical parameter/requirements management tool and environment. In one embodiment, the process includes a product structure classification scheme, a parameter/requirements classification scheme, a parameter/requirements process and maturity model, and in-process and requirements conformance views. In one embodiment, the tool includes a user interface layer, a business layer, a data layer, and a database. The user interface layer may include a product structure feature group, an add/edit/link feature group, a manage maturity feature group, and a manage conformance feature group. The tool may be implemented as a web server accessible to user workstations operating as thin clients. The tool may be integrated with one or more other product development tools, such as a document-driven requirements management, configuration management, manufacturing/production control system, problem management, and phased product delivery process tools.

U.S. Pat. No. 7,409,357 for Quantification of operational risks by inventors Schaf et al., filed Jul. 16, 2004 and issued Aug. 5, 2008, is directed to a system for measuring operational risks. Advanced measurement approaches are used to calculate a value at risk based on loss data that is entered. The advanced measurement approaches that may be used include an internal measurement approach, loss distribution approach and scorecard approaches. The calculated value at risk may also be analyzed using different advanced measurement approaches under a variety of scenarios.

US Patent Pub. No. 2003/0033179 for Method for generating customized alerts related to the procurement, sourcing, strategic sourcing and/or sale of one or more items by an enterprise by inventors Katz et al., filed Aug. 9, 2001 and published Feb. 13, 2003, is directed to a method for generating customized alerts related to the procurement, sourcing, strategic sourcing and/or sale of one or more items by an enterprise. The method is based on a Value Chain Intelligence (VCI) system that enables suppliers and procurement professionals to leverage enterprise and marketplace data in order to potentially improve decision-making in business enterprises. Accordingly, internal data from enterprises and external data from suppliers, catalogs, and marketplaces are integrated and analyzed in real time for their impact on supply chains processes. When an event occurs or data is received potentially affecting decisions regarding the procurement, sourcing, strategic sourcing, and/or sale of one or more items, the system correlates the data with predetermined conditions, which, when satisfied, trigger one or more software modules to send alerts to specified users about the potential impact of the event and/or data on the particular item/s. Alerts may be system-defined or user-defined, and customized according to types of users, messages, media, format, and other factors. Components for implementing this method consist of internal data collection components, external data collection components, data integration components, and data application components. Various methods for searching, extracting, transforming, integrating, analyzing, and representing both internal to an enterprise and data external to an enterprise are also disclosed.

SUMMARY OF THE INVENTION

The present invention relates to computer systems for data aggregation and visualization, wherein the aggregated data is converted into individual key performance indicator (KPI) units and compiled into component spider graphs. The component spider graphs are then compiled into a composite spider graph, wherein the computer system is configured to toggle between layers of a fractalized view of the KPI units displayed on the spider graph.

It is an object of this invention to create a computer system for aggregating data relating to quantitative performance data and qualifiable assessment information wherein an analytics engine converts the data into individual KPI units and compiles the KPI units into comprehensive visualizations for simultaneous consideration of multiple components and composites.

In one embodiment, the present invention includes a system for fractal visualization of qualitative data and quantitative data, wherein the qualitative data and the quantitative data are converted into key performance indicator (KPI) units, wherein the KPI units are compiled into a spider graph visualization of a component, wherein the spider graph visualization of the component is compiled into a spider graph visualization of a composite.

In another embodiment, the present invention includes a method for fractal visualization of qualitative data and quantitative data, wherein the qualitative data and the quantitative data are converted into key performance indicator (KPI) units, wherein the KPI units are compiled into a spider graph visualization of a component, wherein the spider graph visualization of the component is compiled into a spider graph visualization of a composite.

In yet another embodiment, the present invention includes an apparatus for fractal visualization of qualitative data and quantitative data, wherein the qualitative data and the quantitative data are converted into key performance indicator (KPI) units, wherein the KPI units are compiled into a spider graph visualization of a component, wherein the spider graph visualization of the component is compiled into a spider graph visualization of a composite.

In one embodiment, the present invention includes a system for fractal visualization of qualitative data and quantitative data, including a plurality of client devices, a database, an analytics engine, and a user device, wherein the plurality of client devices collects and compiles data, wherein the data includes qualitative data and quantitative data, wherein the database is operable to receive and store data from the plurality of client devices, wherein the analytics engine retrieves the data from the database, converts the data into key performance indicator (KPI) units, and compiles the KPI units into a unit spider graph visualization, wherein the unit spider graph visualization is compiled into a component spider graph visualization, wherein the component spider graph visualization is comprised of KPI components, wherein the KPI components represent a compilation of the KPI units, wherein the component spider graph visualization is compiled into a composite spider graph visualization, wherein the composite spider graph visualization is comprised of KPI composites, wherein the KPI composites represent a compilation of the KPI components, wherein the user device displays the composite spider graph visualization using a graphical user interface (GUI), wherein the GUI is operable to restructure the displayed composite spider graph visualization to the component spider graph visualization for a desired KPI composite, wherein the GUI is operable to restructure the displayed component spider graph visualization to the unit spider graph visualization for a desired KPI component, and wherein the GUI is operable to toggle among the composite spider graph visualization, the component spider graph visualization, and the unit spider graph visualization.

In another embodiment, the present invention includes a method for fractal visualization of qualitative data and quantitative data, including a plurality of client devices obtaining and compiling data, wherein the data includes qualitative and quantitative data, sending the data to a database, retrieving the data to convert into key performance indicator (KPI) units, compiling the KPI units into a unit spider graph visualization, compiling the unit spider graph visualization into a component spider graph visualization, wherein the component spider graph visualization is comprised of KPI components, wherein the KPI components represent a compilation of the KPI units, compiling the component spider graph visualization into a composite spider graph visualization, wherein the composite spider graph visualization is comprised of KPI composites, wherein the KPI composites represent a compilation of the KPI components, displaying a spider graph visualization through a graphical user interface (GUI), and restructuring the displayed spider graph visualization to a desired view, wherein the desired view is the composite spider graph visualization, component spider graph visualization, or the unit spider graph visualization, and wherein the desired view is based on a user input of a desired KPI element, wherein a desired KPI element is comprised of KPI units, KPI components, and KPI composites.

In yet another embodiment, the present invention includes a system for fractal visualization of qualitative data and quantitative data, including a plurality of client devices, a database, a key performance indicator (KPI) catalog, an analytics engine, and a user device, wherein at least one of the plurality of client devices obtains data, wherein the at least one of the plurality of client devices uploads the data to the database, wherein the KPI catalog uses natural language processing (NLP) and machine learning to identify at least one KPI value within the data, wherein the analytics engine retrieves the data from the database, converts the data into KPI units, and compiles the KPI units into a unit spider graph visualization, wherein the unit spider graph visualization is compiled into a component spider graph visualization, wherein the component spider graph visualization is comprised of KPI components, wherein the KPI components represent a compilation of the KPI units, wherein the component spider graph visualization is compiled into a composite spider graph visualization, wherein the composite spider graph visualization is comprised of KPI composites, wherein the KPI composites represent a compilation of the KPI components, wherein the user device displays the composite spider graph visualization using a graphical user interface (GUI), wherein the GUI is operable to restructure the displayed composite spider graph visualization to the component spider graph visualization for a desired KPI composite, wherein the GUI is operable to restructure the displayed component spider graph visualization to the unit spider graph visualization for a desired KPI component, and wherein the GUI is operable to among the composite spider graph visualization, the component spider graph visualization, and the unit spider graph visualization.

These and other aspects of the present invention will become apparent to those skilled in the art after a reading of the following description of the preferred embodiment when considered with the drawings, as they support the claimed invention.

DETAILED DESCRIPTION

Figure 1:
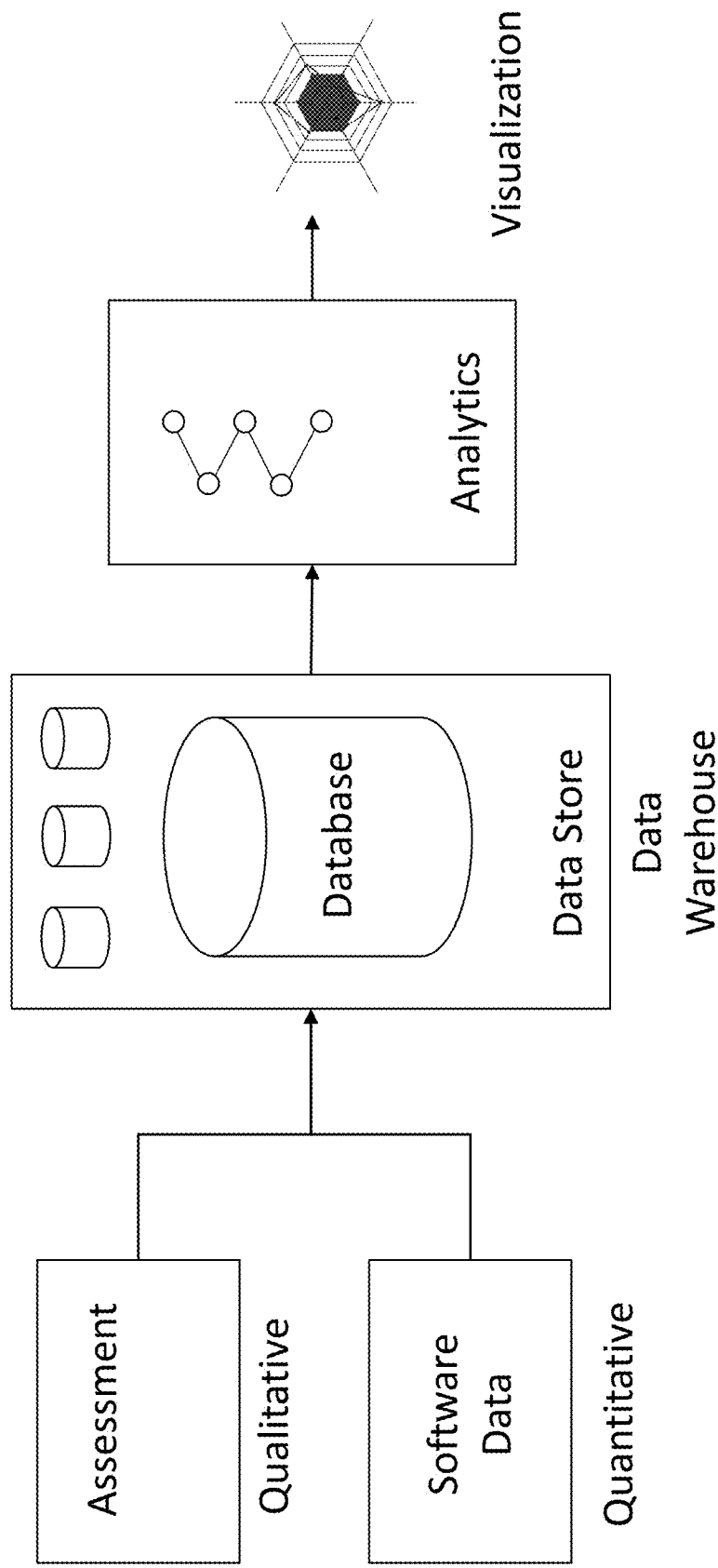
FIG. 1 illustrates a process flow according to one embodiment of the present invention.

The present invention is generally directed to computer systems for data aggregation and visualization with fractal visualization of analyzed and displayed data, including qualitative and quantitative data.

In one embodiment, the present invention includes a system for fractal visualization of qualitative data and quantitative data, wherein the qualitative data and the quantitative data are converted into key performance indicator (KPI) units, wherein the KPI units are compiled into a spider graph visualization of a component, wherein the spider graph visualization of the component is compiled into a spider graph visualization of a composite.

In another embodiment, the present invention includes a method for fractal visualization of qualitative data and quantitative data, wherein the qualitative data and the quantitative data are converted into key performance indicator (KPI) units, wherein the KPI units are compiled into a spider graph visualization of a component, wherein the spider graph visualization of the component is compiled into a spider graph visualization of a composite.

In yet another embodiment, the present invention includes an apparatus for fractal visualization of qualitative data and quantitative data, wherein the qualitative data and the quantitative data are converted into key performance indicator (KPI) units, wherein the KPI units are compiled into a spider graph visualization of a component, wherein the spider graph visualization of the component is compiled into a spider graph visualization of a composite.

In one embodiment, the present invention includes a system for fractal visualization of qualitative data and quantitative data, including a plurality of client devices, a database, an analytics engine, and a user device, wherein the plurality of client devices collects and compiles data, wherein the data includes qualitative data and quantitative data, wherein the database is operable to receive and store data from the plurality of client devices, wherein the analytics engine retrieves the data from the database, converts the data into key performance indicator (KPI) units, and compiles the KPI units into a unit spider graph visualization, wherein the unit spider graph visualization is compiled into a component spider graph visualization, wherein the component spider graph visualization is comprised of KPI components, wherein the KPI components represent a compilation of the KPI units, wherein the component spider graph visualization is compiled into a composite spider graph visualization, wherein the composite spider graph visualization is comprised of KPI composites, wherein the KPI composites represent a compilation of the KPI components, wherein the user device displays the composite spider graph visualization using a graphical user interface (GUI), wherein the GUI is operable to restructure the displayed composite spider graph visualization to the component spider graph visualization for a desired KPI composite, wherein the GUI is operable to restructure the displayed component spider graph visualization to the unit spider graph visualization for a desired KPI component, and wherein the GUI is operable to toggle among the composite spider graph visualization, the component spider graph visualization, and the unit spider graph visualization.

In another embodiment, the present invention includes a method for fractal visualization of qualitative data and quantitative data, including a plurality of client devices obtaining and compiling data, wherein the data includes qualitative and quantitative data, sending the data to a database, retrieving the data to convert into key performance indicator (KPI) units, compiling the KPI units into a unit spider graph visualization, compiling the unit spider graph visualization into a component spider graph visualization, wherein the component spider graph visualization is comprised of KPI components, wherein the KPI components represent a compilation of the KPI units, compiling the component spider graph visualization into a composite spider graph visualization, wherein the composite spider graph visualization is comprised of KPI composites, wherein the KPI composites represent a compilation of the KPI components, displaying a spider graph visualization through a graphical user interface (GUI), and restructuring the displayed spider graph visualization to a desired view, wherein the desired view is the composite spider graph visualization, component spider graph visualization, or the unit spider graph visualization, and wherein the desired view is based on a user input of a desired KPI element, wherein a desired KPI element is comprised of KPI units, KPI components, and KPI composites.

In yet another embodiment, the present invention includes a system for fractal visualization of qualitative data and quantitative data, including a plurality of client devices, a database, a key performance indicator (KPI) catalog, an analytics engine, and a user device, wherein at least one of the plurality of client devices obtains data, wherein the at least one of the plurality of client devices uploads the data to the database, wherein the KPI catalog uses natural language processing (NLP) and machine learning to identify at least one KPI value within the data, wherein the analytics engine retrieves the data from the database, converts the data into KPI units, and compiles the KPI units into a unit spider graph visualization, wherein the unit spider graph visualization is compiled into a component spider graph visualization, wherein the component spider graph visualization is comprised of KPI components, wherein the KPI components represent a compilation of the KPI units, wherein the component spider graph visualization is compiled into a composite spider graph visualization, wherein the composite spider graph visualization is comprised of KPI composites, wherein the KPI composites represent a compilation of the KPI components, wherein the user device displays the composite spider graph visualization using a graphical user interface (GUI), wherein the GUI is operable to restructure the displayed composite spider graph visualization to the component spider graph visualization for a desired KPI composite, wherein the GUI is operable to restructure the displayed component spider graph visualization to the unit spider graph visualization for a desired KPI component, and wherein the GUI is operable to among the composite spider graph visualization, the component spider graph visualization, and the unit spider graph visualization.

None of the prior art discloses fractal spider graphing methods for fractal visualization of data, wherein selecting a component of the graph repopulates the graph with data derived by converting the qualitative and quantitative data into a key performance indicator (KPI) unit, compiling the KPI units into a component, and compiling the components one or more times to create a composite, wherein selecting a component of the composite graph generates a spider graph of the component wherein individual KPI units are displayed as values on the spider graph.

Performance analysis is a pivotal aspect of understanding any corporation, organization, or industry, particularly those which incorporate a human element. Understanding performance assists in determining the goals, business strategies, standard procedures, and personalization of interactions within an organization. With the increasing incorporation of software in business, commerce, and communication, it is vital to understand the aspects which differ between employees, teams, departments, and regions in order to regulate performance, achieve efficiency, and align understandings within a company or organization.

Some prior art considers qualitative and quantitative data in order to evaluate certain performance areas. These evaluations may include composite scores to aggregate multiple performance scores. However, the prior art fails to disclose a fractal spider graph used to visualize multiple levels of organizational performance as in the case of the present invention. The present invention advantageously includes multiple levels of performance scoring at the KPI unit, component, and composite level. In this way, the fractal spider graph allows a user to "zoom out" from a visualization of a lower level of the fractal hierarchy of the spider graph to view the effect of the KPI unit scores of the present invention on the performance of an individual, the effect of the performance of the individual on the team, the effect of the performance of the team on the department, etc. The prior art fails to disclose any fractal capability of the data visualization.

Some prior art attempts to predict future performance by evaluating qualitative and quantitative data to predict improvement and growth strategies. This prior art attempts to predict the outcome of future events and changes based on observed data. However, the system of the present invention does not predict a course of action based on the analysis of data. The present invention generates a visualized analysis of past performance without attempting to predict the future trend of the data. The goal of the present invention is to create a visualization of the performance of multiple data points to determine the strengths or weaknesses of certain data points as well as compare the impact of these scores on multiple hierarchical levels within an organization.

The fractal visualization of the present invention is a hierarchical structure which uses KPI units as the smallest unbreakable unit within a data set. Examples of KPI units include but are not limited to recorded instances (e.g., idling events), numerical data (e.g., average miles per event), and quantified data which cannot be further broken down (e.g., yes-no questions). A KPI unit score is created by quantifying the KPI units. Examples of KPI unit scores include but are not limited to a number of recorded instances (e.g., number of idling events, number of sales pitched, number of times a specific word is used in a qualifiable assessment), a numerical quantification of data (e.g., average miles per event, total sales in terms of USD), and quantification of data which cannot be further broken down (e.g., yes-no questions). The KPI unit score is then plotted along the axis of the unit graph corresponding to that KPI unit. The KPI unit scores are displayed along the axes of a unit graph. The KPI unit scores are analyzed and converted into an overall score for the unit graph, which is based on a scale from 1-100. A score of 100 is the best score on this scale and represents the metric from the highest scoring person in the dataset. A score of 0 is the worst score and represents the metric from the lowest scoring person in the dataset. In one embodiment, the system of the present invention includes a KPI catalog for receiving, evaluating, converting, and transmitting data received from one or more client devices. The KPI catalog determines the data which should be included for determining the KPI unit for each component and evaluates the KPI unit score for each value based on a 0 to 100 scale averaging the most common values for a given schema or KPI unit to determine the lower and upper bounds of the scale. The KPI catalog is further configured to receive an indication of an inverted scale, where a score of zero is desired, and values closer to zero are scored higher on the 0 to 100 scale than KPI values that are greater than zero.

As used herein, the term "graph" refers to a spider graph. One of ordinary skill in the art will appreciate that a spider graph is comprised of three or more axes beginning at the center of the graph and extending outward. The axes of the present invention represent unit scores, component scores, and/or composite scores compiled into a spider graph.

The present invention compiles multiple component scores into a component graph, which is a spider graph that simultaneously displays multiple component scores along the axes of the graph. The component graph further includes a composite score based on the component KPIs. This composite score is based on a scale from 1 to 100 and uses the component KPIs to construct the overall composite score. One or more component graphs are then compiled into a composite graph. The composite graph displays multiple composite scores along the axes of the composite graph. The composite graph further includes a score based on the composite KPIs. This score is based on a scale from 1 to 100, and uses the composite KPIs to construct the overall score.

The computer system of the present invention receives an input of a desired composite KPI (i.e., a component) within the composite graph using a graphic user interface (GUI) of a device, which restructures the displayed spider graph into the component graph for that composite KPI (i.e., that component). The computer system then receives a selection of a desired component KPI (i.e., a unit) within the component graph using a graphic user interface (GUI) of a device, which restructures the displayed spider graph into the unit graph for that component KPI (i.e., that unit). This advantageously enables a fractal view of the analyzed data, as the present invention allows a user to focus in on a high-level overview of data or a close-up view of data details.

Referring now to the drawings in general, the illustrations are for the purpose of describing one or more preferred embodiments of the invention and are not intended to limit the invention thereto.

FIG. 1 is a schematic diagram of a process flow according to one embodiment of the present invention. Qualitative data 105 and quantitative data 110 are compiled by one or more client devices. Both qualitative data 105 and quantitative data 110 are stored in a database 115 for retrieval by the analytics engine 120 of the present invention. The analytics engine 120 converts the data into KPI units before converting the analysis into a fractal visualization 125 displayed on a user device.

In one embodiment of the present invention, qualitative data is generated by one or more user devices, one or more sensors, and/or one or more software systems. Examples of qualitative data include but are not limited to performance assessments, quarterly evaluations, supervisory reviews, client administered surveys, documents, audio recordings, video recordings, photographs, self-assessments, transcriptions, and observations. One of ordinary skill in the art will appreciate that different client industries will include a variety of qualitative data types, and the examples included herein are not intended to be an exhaustive list of qualitative data types. For example, a law enforcement client upload includes at least video recordings, transcripts, documents, and surveys, while an insurance client company upload includes damage reports, client administered surveys, documents, and quarterly evaluations. In one embodiment, the database of the present invention is operable to receive a transmission of one or more qualitative data types. In one embodiment of the present invention, qualitative data is evaluated using natural language processing (NLP) before being uploaded to the database of the present invention. In one embodiment of the present invention, qualitative data is uploaded directly to the database of the present invention upon generation of the qualitative data. In one embodiment of the present invention, qualitative data is not made available to the user of the one or more user devices before it is uploaded to the database of the present invention. In one embodiment, the qualitative data is obtained by a sensor connected to the one or more user devices and/or a software system employed by the one or more user devices and is uploaded directly to the database of the present invention.

In one embodiment of the present invention, quantitative data is generated by one or more user devices, one or more sensors, and/or one or more software systems. Examples of quantitative data include but are not limited to quarterly reports, revenue, measurements, projections (e.g., revenue projections generated by the client), mathematical aggregations, and numerical values. One of ordinary skill in the art will appreciate that different client industries will include a variety of quantitative data types, and the examples included herein are not intended to be an exhaustive list of quantitative data types. In one embodiment, the database of the present invention is operable to receive a transmission of one or more quantitative data types. In one embodiment of the present invention, quantitative data is uploaded directly to the database of the present invention upon generation of the quantitative data. In one embodiment of the present invention, quantitative data is not made available to the user of the one or more user devices before it is uploaded to the database of the present invention. In one embodiment, the quantitative data is obtained by a sensor connected to the one or more user devices and/or a software system employed by the one or more user devices and is uploaded directly to the database of the present invention.

In one embodiment, data is collected via one or more sensors attached to the one or more user devices. Examples of sensors utilized by the system of the present invention includes but are limited to mouse trackers, keystroke loggers, GPS sensors, vehicle monitoring sensors, accelerometers, gyroscopic sensors (including rotary gyroscope, vibrating gyroscopes, optical gyroscopes, micro-electro-mechanical system gyroscopes), proximity sensors (including passive infrared sensors, ultrasonic sensors, microwave sensors, etc.), optical sensors (including photodetectors, fiber optics, and pyrometers. In one embodiment, the sensor of the present invention is a medical device sensor or sensor used for medical car, including but not limited to a thermometer, heart rate monitor, pulse oximeter, one or more electrodes used during an electroencephalogram (EEG) test, and one or more pressure sensors used to measure blood pressure.

In one embodiment, one or more of the sensors used by the system of the present invention is not attached to the one or more user devices. In one embodiment, the sensor is in remote network connection with the database of the present invention, wherein information is uploaded directly from the sensor to the database of the present invention. One of ordinary skill in the art will appreciate that the variety of sensors disclosed herein are advantageous for observing multiple variables that differ between industries. For example, the accelerometer and/or gyroscopic sensor is advantageous for use on fleet tracking, wherein driver behavior KPI values (e.g., speed, idling, hard cornering, and severe acceleration) are the observed data. However, for the culinary industry, proximity sensors are advantageous for determining how many times a grill cook leaves the grill station, and optical sensors assist in determining how often a hostess seats someone in a specific section of a restaurant.

In some embodiments of the present invention, data is collected via one or more software systems. In one embodiment, the software system is applied to the one or more user devices. In one embodiment, the software system is used to evaluate sensor data gathered by one or more sensor of the present invention. Exemplary software systems include but are not limited to file system reporting software, data tracking software, fleet tracking software, vehicle monitoring systems, file activity monitoring software, auditing software, and customer relationship management (CRM) systems. One of ordinary skill in the art will appreciate that the software systems of the present invention advantageously allow for quantifying actions related to the regulatory functions of the industry (i.e. calls, emails, file uploads, document updates, etc.). For example, software of the present invention is operable to determine the number of updates made to a file, the number of emails sent by an employee, team, department, etc., and the number of calls made by an employee, team, department, etc. and the person to whom each call and/or email was directed.

In one embodiment of the present invention, one or more sensors of the present invention is configured to be integrated into the software system of the present invention. In one embodiment, one or more of the software systems and/or sensors of the present invention are configured to be integrated with user activity tracking. For example, one or more user devices creates an online menu display for a restaurant. The keylogging software tracks what was included in the menu, the file activity monitoring software determine how many times the menu was uploaded and/or changed. The user activity tracker then determines the efficacy of the various menu placement options based on how frequently certain menu options are selected. In this way, the present invention is operable to incorporate data from the interaction of third party devices with the at least one user device and/or data produced by the one or more user devices.

In one embodiment, the system of the present invention is configured to receive information from one or more medical devices and/or health care industry software platforms. In this way, the present invention is able to determine, for example, the impact of shift length or frequency of double shifts on the performance of a user associated with a profile on the software system (i.e., connected via a user device to the software system). In one embodiment, the system of the present invention is configured to receive data from on or more call centers, including transcripts, audio recordings, and video recordings.

In one embodiment, the system of the present invention utilizes NLP and machine learning to construct a textual narrative based on the analyzed data. The NLP algorithm constructs a narrative analysis describing how observed data points are related. In one embodiment, the textual narrative is generated in paragraph form. In one embodiment, the textual narrative includes generated prompts for response, questions, and recursive action plans to reach the ideal score for a given data point. For example, upon receiving qualitative and quantitative data for a restaurant including sales metrics, pricing, individual item sales, and sales locations, the present invention is operable to determine, using machine learning, that the behavior of a first item is not commensurate, with the ordering patterns and the popularity of the product amongst all the patrons of the restaurant. The textual narrative then includes a description comparing the performance of the first item to similar items on the menu which are generating higher sales. The present invention is then operable to generate an observation that the first item is located in the wrong location in the menu for the goal of increasing sales. In one embodiment, the present invention is operable to generate a suggestion that changing the location of the first item in the menu may increase sales of the first item.

The present invention evaluates the data collected via the one or more sensors, sources, and systems. In one embodiment, the KPI catalog of the present invention uses the natural language processing (NLP) to categorize the data and determine the KPI values and KPI unit scores for a specific component. For example, the KPI catalog is operable to evaluate a survey response, determine a value correlating to a response (e.g., a value of 5 corresponding to a written/typed response of "strongly agree" or "definitely"), and categorize the response for input into the data visualization of the present invention. In one embodiment, the KPI catalog produces a data set including multiple layers of KPI units, components, and composites, such that entry of the data into the analytics engine results in a multilayer spider graph.

In one embodiment, the system of the present invention is configured to receive data in a KPI catalog according to a predetermined schema. In one embodiment, the schema is determined by the KPI catalog upon receiving the data (e.g., a CRM software uploads data relating to the number of calls ended prematurely and the KPI catalog determines the data should be listed under the label "premature call ending"). In one embodiment, the KPI catalog is configured to receive data according to a predetermined schema. In one embodiment, the schema is determined via input received from a user device. In one embodiment, the schema is determined according to the schema of the software and/or sensor that transmits the software to the KPI catalog of the present invention. In one embodiment, data produced by the software, sensors, and or the one or more user devices is converted into one or more CSV files for storage as a data table. In one embodiment, the system of the present invention incorporates a CSV conversion software (e.g., CSV box) for converting the data into a data table including identified schema.

The schema of the present invention is the categorization of KPI values within the corresponding components and/or composites. This hierarchical nesting of KPI values within components and components nested within composites is operable to scale upwardly to fit the needs of a variety of industries and data display requirements. For example, a credit card service is operable to divide their companies into regional bases: the northeast region, the southeast region, the midwestern region, and the western region. Each region is further broken into individual credit company locations (i.e., singular buildings) by location within that region. Each location is divided into three departments: customer service, billing, and collections. The billing department is divided into teams, which are further divided into individual employees. Each employee has a component graph showing, for example, the "7 C's" that are characteristic of the companies ideal behaviors/attributes. Each characteristic (i.e., each component) has an individual unit graph including the relevant KPI values and the KPI unit scores for each KPI value (i.e., the KPI unit data generated by the KPI catalog). By observing the KPI unit score for each component of each employee, the present invention is operable to display the hierarchical impact of individual data points of the performance of the overall system.

Upon receiving the data in each schema, the system of the present invention evaluates the metrics of each schema to identify the KPI values for the components according to one embodiment of the present invention. The KPI catalog allows for a user to view, manipulate, and combine the schema uploaded by a user device. In one embodiment, the KPI catalog receives an input of the KPI schema which should be analyzed, either alone or in combination, to produce a given KPI unit and/or component. In one embodiment, the KPI catalog uses natural language processing (NLP) and machine learning to identify one or more key performance indicator (KPI) values within the data (e.g., the platform identifies hard braking as a key performance indicator value based on driver performance data generated by in-vehicle monitoring systems (IVMS) and/or telematics devices). In one embodiment, the KPI catalog receives an input of one or more combinations of schema to produce a custom schema. In one embodiment, the KPI catalog produces an output of the KPI schema which should be analyzed, either alone or in combination, to produce a given KPI unit and/or component. In one embodiment, the KPI catalog produces an output of the KPI schema which should be analyzed, either alone or in combination, to produce a given KPI unit and/or component.

In one embodiment, the database of the present invention receives both qualitative and quantitative data from one or more user devices, software systems, and/or sensors of the present invention. In one embodiment, this data is then uploaded to the KPI catalog of the present invention using the CSV conversion software. In one embodiment, the qualitative and quantitative data is uploaded to a database via wireless network connection. The data is then saved in the memory of the database server. In one embodiment, the present invention utilizes a cloud platform to store the data of the present invention. Exemplary cloud platforms include but are not limited to Amazon Web Services (AWS), Microsoft Azure, and Google Cloud Platform.

For example, in one embodiment of the present invention, a KPI catalog of the present invention receives the results of a ten questions survey wherein the survey software received an input from a user device including a response indicating that the associated user agreed, strongly agreed, disagreed, strongly disagreed, or was impartial. The KPI catalog of the present invention converts these scores into a numerical scale from one to five. The KPI catalog then uses this data to determine an overall KPI score for the given value (e.g., using NLP analysis and or numerical evaluation).

In one embodiment, the present invention uses an analytics engine to process the schema produced by the KPI catalog. In one embodiment, the KPI catalog receives an input from a client device and/or an administrator device including one or more KPI values that should be quantified from the data. The KPI catalog uses machine learning and natural language processing to quantify these KPI values (e.g., number of hard braking incidents by the driver) to determine the KPI component which uses the KPI value as a metric unit. The present invention then configures the schema according to the determined KPI values, components, and compositions. In one embodiment, this reconfiguration is uploaded to the analytics engine of the present invention.

In one embodiment, the KPI catalog of the present invention is a cloud based service, wherein the KPI algorithm is stored on a cloud server. In one embodiment, the KPI catalog of the present invention is a software algorithm stored within a software application. In one embodiment, the KPI catalog is programmed into a user device of the present invention.

In one embodiment, the KPI catalog of the present invention includes multiple data sets within each catalog. In one embodiment, the present invention updates the KPI catalog as new data is uploaded from the sensors, software platforms, and/or the one or more user devices of the present invention. In one embodiment, the KPI catalog of the present invention is specific to a single set of user devices associated with a single industry. In one embodiment, the present invention includes one or more KPI catalogs. In one embodiment, multiple KPI catalogues of the present invention are operable to interact with each other, refer to other catalogs, and create a network wherein the KPI catalogs are able to share information, algorithms, and other data.

The analytics engine determines the position along the axis of the graph corresponding to that KPI value where the data point should be located. In one embodiment, the present invention accesses the KPI catalog of the present invention and analyzes the stored data. In one embodiment, the present invention utilizes Microsoft Power BI as the analytics engine to analyze the data. In one embodiment, the present invention utilizes Sisense, Google Data Studio, Plotly, Domo, and/or Infogram to analyze the data of the present invention.

The computer platform of the present invention then generates a fractal spider graph visualization of the analyzed data, using the KPI units to create a unit graph and score the component analyzed with respect to the unit graph. The components are then compiled into a second layer of the fractal spider graph in order to display the impact of multiple component scores with respect to a given composite (i.e., a factor which is scored based on the score of the components which comprise the composite). The composites are then compiled into a third layer of the fractal spider graph in order to display the impact of multiple composite scores with respect to a given factor (i.e., a factor which is scored based on the score of the composites which comprise the factor). One of ordinary skill in the art will appreciate that this structure allows for further nesting beyond three layer fractal spider graphs, as data is further visualized with respect to the factors identified by the system of the present invention which affects the scoring of the present invention.

The KPI catalogue of the present invention is integral to the creation of fractal spider graphs which allow for hierarchical and lateral spider graph visualization of the identified KPI values. The use of simple data generated by the software, sensors, and one or more user devices as an input to the analytics engine of the present invention results in the production of a static graph visualization that does not allow for any "zoom-in" or "zoom-out" functionality of the graph. The input generated by the KPI catalog is a necessary component for the creation of a dynamic, fractal spider graph which allows for the display of multiple layers of KPI units, components, and composites, as in the case of the present invention.

The system of the present invention is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system of the present invention is operable to use any of the aforementioned learning techniques alone or in combination.

Further, the system of the present invention is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system of the present invention is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the system of the present invention does not predict a future trend of performance (i.e., performance data) based on the analysis of data. In one embodiment, the goal of the present invention is identifying problem areas based on analyzed qualitative and quantitative data and creating a nested spider graph display for this analysis. This allows for dynamic visualization of multiple components and factors which affect the performance (i.e., the performance data) by selecting the KPI values, components, composites, and additional factors (e.g., performance comparison display) and viewing the data used to score the components and composites of the present invention.

Figure 2:
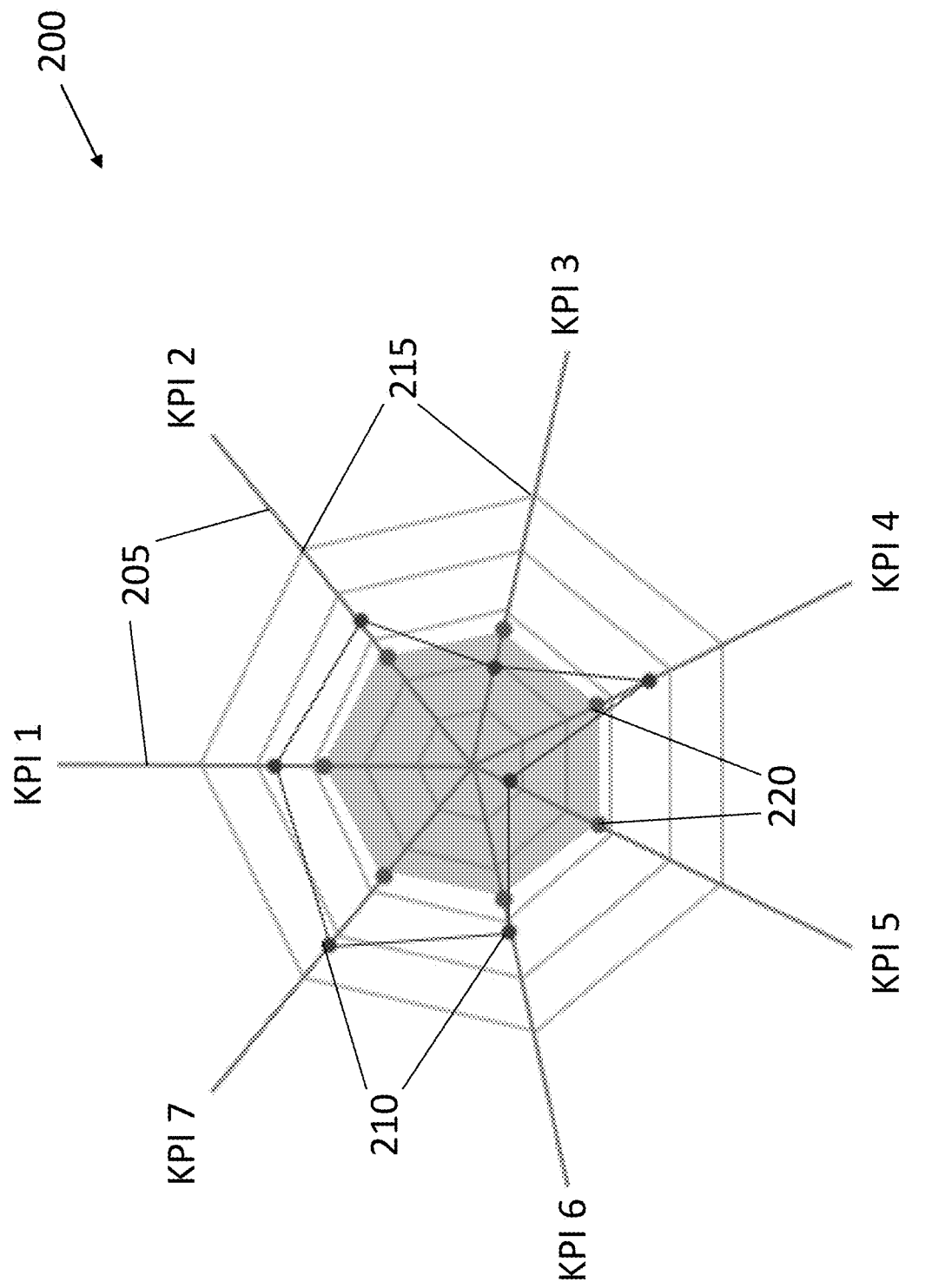
FIG. 2 illustrates a generic unit spider graph according to one embodiment of the present invention.

The present invention then incorporates this data into a fractal spider graph. The lowest hierarchical level of the fractal spider graph is the unit graph. FIG. 2 depicts a unit graph 200 according to one embodiment of the present invention. The unit graph 200 includes the KPI values as axes 205, with the quantified KPI units, referred to herein as KPI unit scores 210, plotted along the axis corresponding to the KPI value associated with the quantified KPI unit. The graph further includes a legend 215, which indicates the maximum performance possible for a given KPI. The average performance 220 displays the average performance of all data from the client for that KPI value.

In one embodiment, the computer system of the present invention determines the legend for a spider graph by evaluating the highest score achieved with regard to that KPI value, component, and/or composite. In one embodiment, the computer system of the present invention receives an input from a client device, wherein the input includes a set maximum score possible for a given KPI value, component, and/or composite. In one embodiment, each fractal spider graph includes a legend to indicate the upper limit of the scoring possibility.

In one embodiment, the present invention includes an archetype as a legend, wherein the archetype represents the ideal scoring for each KPI unit, component, or composite addressed by the graph. For example, a performance archetype indicating the ideal scoring for a Social archetype includes an expected scoring overlay mimicking the archetype rather than the average. The KPI values indicating social behaviors such as client interactions (indicated by, e.g., CRM feedback from client surveys) would be higher than those expected for other behaviors, such as efficiency.

In one embodiment, the average score of the present invention is determined by observing the average KPI unit score, component score, and/or composite score of all data points gathered by the system of the present invention. In one embodiment, the computer system of the present invention receives an input from a client user device including an indication of the data sets that should and/or should not be included in calculating the average for a given fractal spider graph. For example, the computer system receives a selection of data points corresponding to a team, department, or other subgrouping of datasets. The computer system of the present invention then uses this data to generate the average score for the KPI units, components, and composites for those selected data sets.

Figure 3:
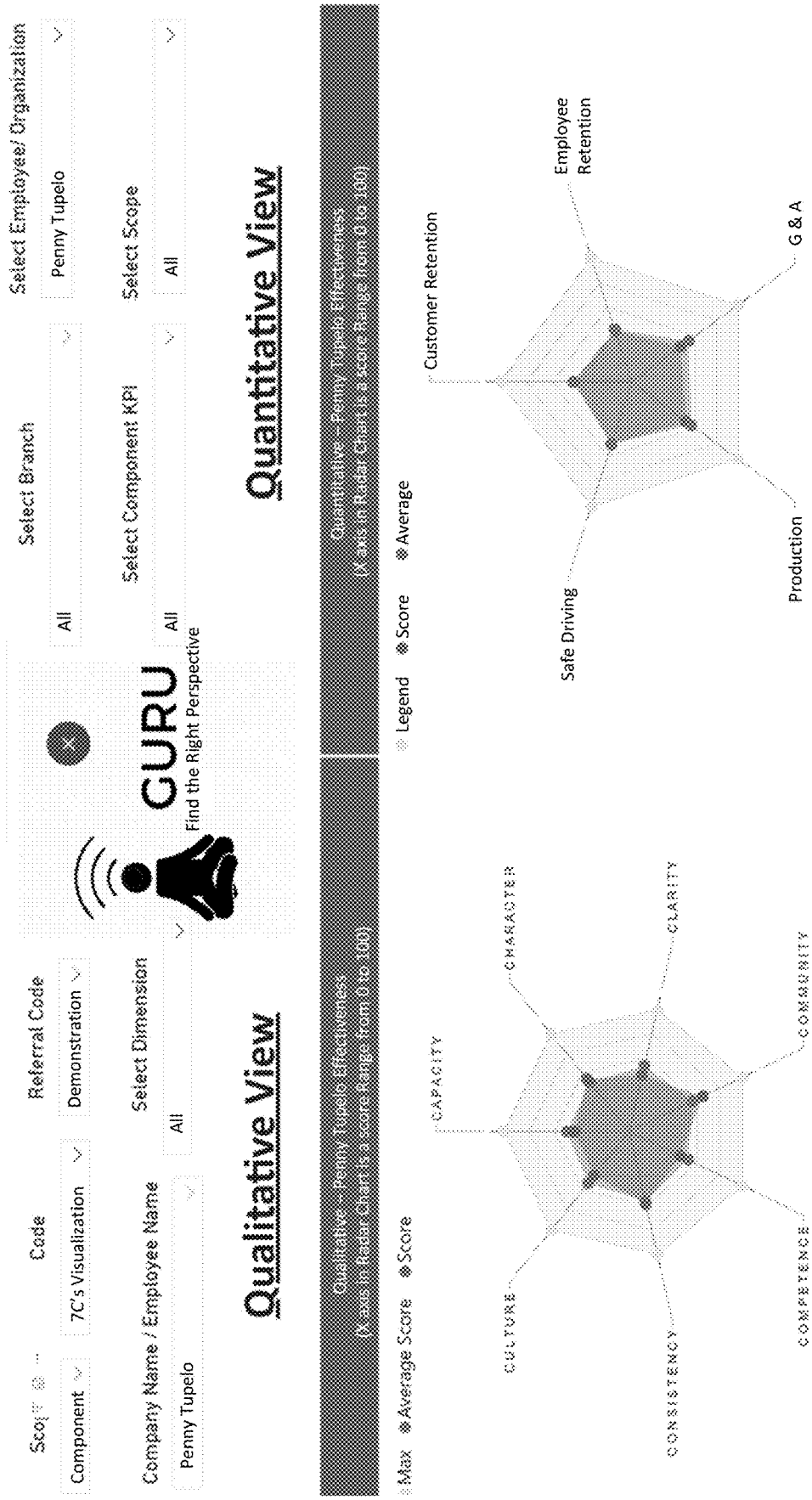
FIG. 3 illustrates a side-by-side view of two graphs according to one embodiment of the present invention.

FIG. 3 illustrates a display of the qualitative graph and quantitative graph according to one embodiment of the present invention. The qualitative and quantitative data are displayed simultaneously in a "split-screen" configuration, wherein the fractal spider-graph of the qualitative data is displayed on a user GUI and the fractal graph of the quantitative data is displayed adjacent to the qualitative graph on the GUI simultaneously.

In one embodiment, the present invention is operable to use a machine learning algorithm to identify the relative indications displayed in a data set. In one embodiment, the present invention analyzes both the qualitative and quantitative data to generate a derived observation (e.g., "weakness," "strength," "insight"). For example, a first quantitative spider graph for User A has completed only 70% of their quarterly assignments, and the qualitative data displays a survey response to the quantifier "I often feel overwhelmed with my work" indicating User A strongly agrees with the feeling of being overwhelmed at work. The present invention analyzes both the qualitative and quantitative data to generate an observation that User A is likely being assigned too much work, given that they are unable to complete their entire assignment workload, resulting in a feeling of being overwhelmed. The present invention is further operable to use artificial intelligence (e.g., analyzing a database of recommended recursive actions) to determine and suggest a plan of recourse for the subject represented by the data. In the case of the present example, the present invention is operable to generate and display to the GUI a suggestion that User A receive fewer assignments for the next quarter.

One of ordinary skill in the art will understand that the observation and/or recursive action generated by the present invention is not limited to behavioral observations, such as the weaknesses and strengths of an individual represented by the data. Nor is the present invention limited to solutions tailored to adjusting behavior. In one embodiment, the present invention is operable to analyze qualitative and quantitative data in order to determine an observation relating to the data, including but not limited to data relating to items, organizations, events, and behavior. For example, the placement of items on a menu to increase item sales, organization of distribution warehouses to improve efficiency, and the analysis of the weaknesses and strengths of an investment portfolio are possible using the system of the present invention. These examples do not serve to limit the invention thereto, but are rather exemplary of the various functional capabilities of the present invention.

FIG. 3 further depicts an example of predetermined KPI values according to one embodiment of the present invention. The 7C's visualization, including KPI values for capacity, character, clarity, community, competence, consistency, and culture, is a pre-determined KPI value set established by an input to the KPI catalog of the present invention. Upon receiving an input to create a visualization of the 7C inputs, the KPI catalog of the present invention generates both a graph of the 7C's and a graph of the quantitative values that impact the qualitative scores. In one embodiment of the present invention, the KPI catalog is operable to identify the quantitative data corresponding to each qualitative KPI value. In one embodiment, the KPI catalog accesses a KPI catalog database to determine the quantitative data which corresponds to a qualitative score. For example, the KPI catalog is operable to identify a quantitative value of "safe driving" is associated with the "character" qualitative value. In one embodiment, the KPI catalog receives an input to associate "safe driving" quantitative data with "character" qualitative data.

In one embodiment, the displayed qualitative graph is not directly associated with the displayed quantitative graph. One of ordinary skill in the art will appreciate that not all quantitative data points will have a directly corresponding qualitative data point. However, consideration of both qualitative and quantitative data provides a wholistic understanding of the subject of the collected data. In this way, both quantitative factors and qualitative factors are operable to be considered by the present invention and/or a user of the present invention to generate an analysis of the strengths, weaknesses, insights, and plans for recourse for adjust the data.

One of ordinary skill in the art will appreciate that over time, the desired KPI values visualized by the system of the present invention are operable to change. In one embodiment, the present invention is operable to reconstruct the KPI catalog based on desired KPI values. For example, one or more user devices of a retail company inputs KPI set A including KPI values 1, 2, 3, 4, and 5. Upon generation of the KPI values based on the collected data associated with the values, the one or more user devices of a retail company generate a new input upon deciding that KPI value 5 does not display an ideal value. The one or more user devices of a retail company then input a command to generate a graph of KPI set B, including KPI values 1, 2, 3, 4, and 6. In this way, the present invention allows for an iterative acclimatization of data points. In one embodiment, this process is an iterative acclimatization of data points, wherein the KPI catalogue is operable to create hybridized KPI values, wherein the KPI score is determined by combining multiple data categories. For example, the KPI catalog is operable to determine that a data input of "time spent on a call" is not an accurate representation to determine client conversion. The KPI catalog then combines a data category of "time spent on a call" with "number of appointments booked." The use of both data categories better identifies the client conversion for a given employee.

In one embodiment, the KPI catalog of the present invention is operable to determine the industry standard factors considered in determining performance in a given field. These industry standards are considered to be representative of the KPI value for which the catalog receives on input to generate a visualization. In one embodiment, the KPI catalog receives an input of an industry standard to use when generating a KPI visualization, wherein the KPI catalog is operable to determine one or more data categories corresponding to the industry standard.

As depicted in FIG. 3, the present invention includes a drop down menu of selectable KPI sets, wherein the drop down menu includes a list of KPI sets (i.e., code) wherein selecting the KPI set generates a visualization of the KPI categories including quantitative data and the KPI values displaying qualitative data for the KPI set. In one embodiment, the KPI catalog includes multiple KPI set, wherein selecting a new KPI code regenerates the visualization of the data according to the newly selected KPI set. In one embodiment, this includes restructuring the data categories to reflect the newly selected KPI set. One of ordinary skill in the art will appreciate that the data considered for a given KPI set differs from the data considered for another KPI set, thus requiring the restructuring of certain data categories in order to accurately assess the data to create visualizations for different KPI sets. In one embodiment, this restructuring is done manually. In one embodiment, the data categories of the KPI catalog are restructured automatically.

The present invention further includes one or more drop down menus of selectable considerations to include when structuring a graph, including but not limited to Scope, Referral Code, Company Name, Employee Name, Dimension, Branch, and Component KPI. In one embodiment, the qualitative display is generated using data associated with a first subject (e.g., a first employee, a first event) while the quantitative data display is generated using data associated with a second subject (e.g., a second employee, a second event).

Figure 4A:
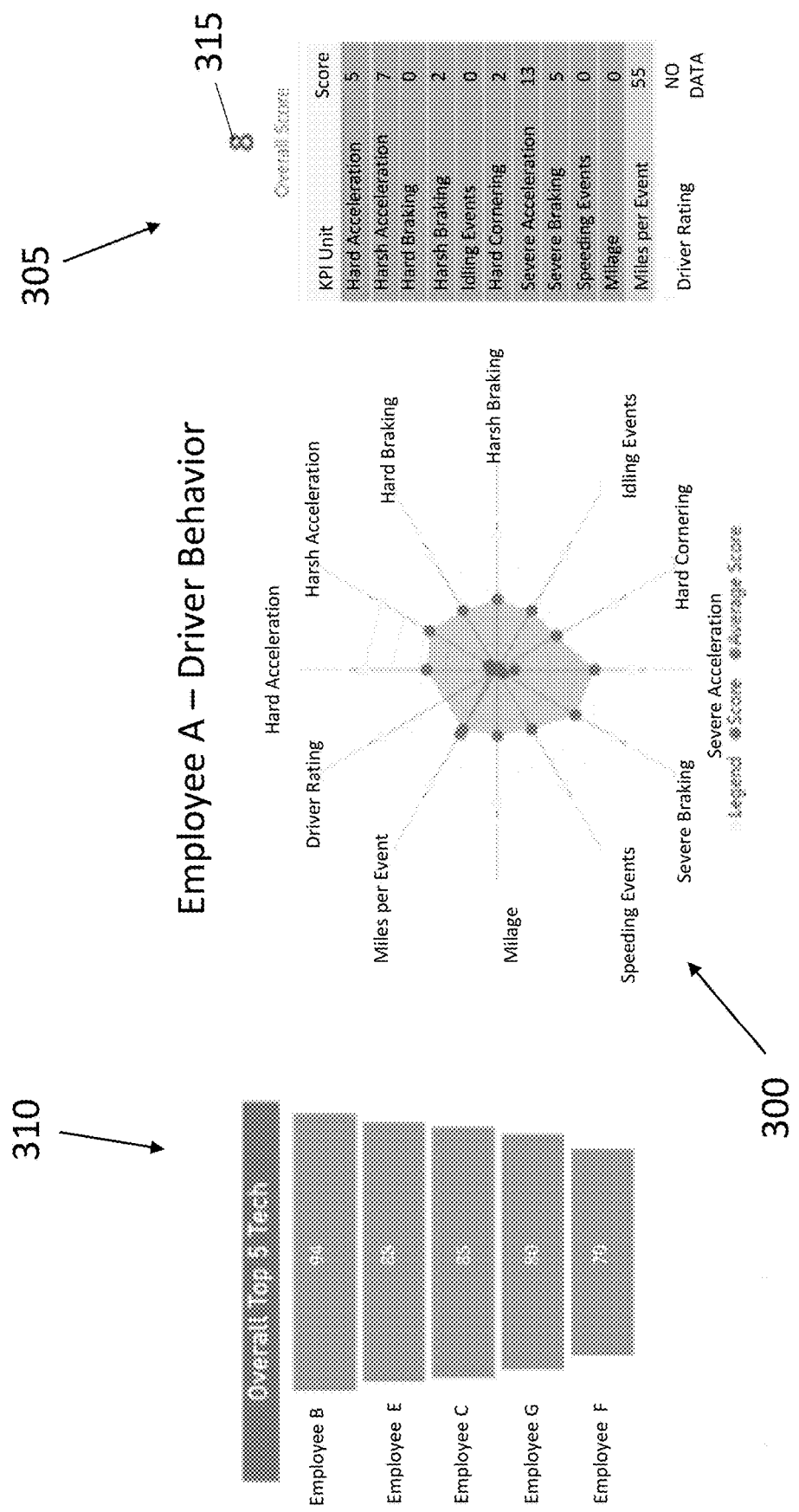
FIG. 4A illustrates a unit spider graph display according to one embodiment of the present invention.

FIG. 4A is an illustration of a unit graph display according to one embodiment of the present invention. The display includes a unit graph 300 for driver behavior and a table 305. The table 305 includes the KPI unit scores for each KPI value, as well as the overall component score 315. The component score 315 for the unit graph 300 is 8. The KPI values observed for determining a component score for driver behavior are hard acceleration, hard braking, harsh braking, idling event, hard cornering, severe acceleration, speeding events, mileage, miles per event, and driver rating. In one embodiment, the system of the present invention receives an input to incorporate hard acceleration, hard braking, harsh braking, idling event, hard cornering, severe acceleration, speeding events, mileage, miles per event, and driver rating for determining a score for the driver behavior component (i.e., the component for which KPI values are compiled and an overall score is determined). The performance comparison chart 310 compares the component scores of multiple employees with regard to the selected component (i.e., driver behavior).

In one embodiment, the performance comparison chart displays the top five highest component scores for a given component identified by the analysis. In one embodiment, the performance comparison chart does not display the highest component scores for a given component identified by the analysis. In one embodiment, the system of the present invention receives a selection of the employees desired for comparison to the employee for which the component is being scored. The name of each employee is displayed with an associated bar in a bar graph to compare the component scores between the selected employees and the employee for which the spider graph is being constructed.

The component score for a component is determined based on the analysis of the KPI unit scores for each KPI value comprising the component. This score is determined on a scale from 0-100. In one embodiment, the scale for the component score based on parameters received by the computer system of the present invention from a client device. For example, system receives a an input of zero when prompting for the desired score for certain KPI values (e.g., hard acceleration, harsh braking) while other KPI values include numerical ideals (e.g., 55 miles per event) and the KPI unit is scored based on deviation from the ideal numerical values. In one embodiment, the computer system of the present invention receives an input from the client device indicating certain components are weighted more heavily than others. For example, the input includes an emphasis of 0.3 for efficiency behavior and a 0.15 for priority alignment. Thus, the client indicates that the efficiency behavior component should comprise 30% of the overall score while priority alignment should only comprise 15% of the overall composite score. In one embodiment, the component score is calculated based on the average KPI unit score for a KPI value. In one embodiment, the component score is calculated based on the average KPI unit scores for all employees with respect to that component. One of ordinary skill in the art will appreciate that there are several viable scoring methods which are known to the art for scoring data on a scale of 0 to 100. These scoring methods disclosed herein are not meant to be an exhaustive enumeration but rather serve to emphasize the function and features of the present invention. The component score is then used to plot a spider graph at a second level of the hierarchy of the fractal visualization of data, referred to herein as a component graph.

In one embodiment, the table 305 lists the KPI units and scores according to a color code. In one embodiment, this color code is determined by the system of the present invention. In one embodiment, a row of the table containing a KPI unit score from 0-33 is colored red, a row of the table containing a KPI unit score from 34-66 is colored yellow, and a row of the table containing a KPI unit score from 67-100 is colored green. In one embodiment, a row of the table containing a KPI unit score from 0-50 is colored red, a row of the table containing a KPI unit score from 50-75 is colored yellow, and a row of the table containing a KPI unit score from 76-100 is colored green. In one embodiment, the computer system of the present invention receives a selection of the range of KPI unit scores that will be coded by color when the table containing KPI unit scores is displayed. In one embodiment, the system of the present invention is operable to receive a selection of a color for use in color coding the KPI unit scores.

Figure 4B:
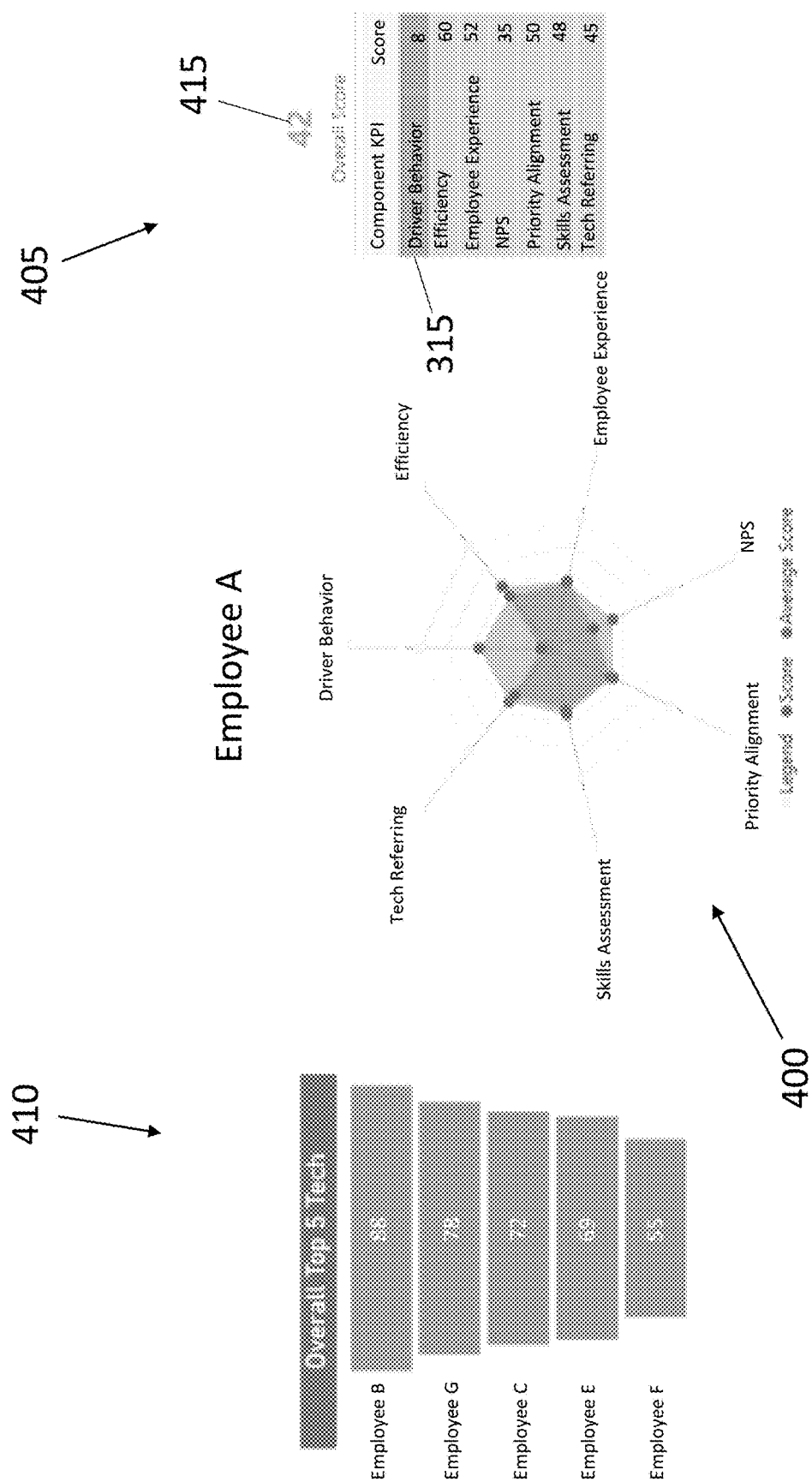
FIG. 4B illustrates a component spider graph display according to one embodiment of the present invention.

FIG. 4B depicts a component graph display for Employee A according to one embodiment of the present invention. The component graph display includes a component graph 400 and a table 405. The table 405 includes the KPI component scores for each KPI component, including the component score 315 for driver behavior, as well as the overall composite score 415 which is the score based on the analysis of multiple component scores. The component score 415 for driver behavior is taken from the unit graph depicted in the unit graph of FIG. 4A. The composite score for the component graph 400 is 42. The KPI components observed for determining a composite score for Employee A are driver behavior, efficiency, employee experience, NPS, priority alignment, skills assessment, and tech referring. In one embodiment, the computer system of the present invention receives a selection of driver behavior, efficiency, employee experience, NPS, priority alignment, skills assessment, and tech referring for compilation into the composite score for Employee A (i.e., the user for which KPI components are compiled and an overall score is determined). The performance comparison chart 410 compares the composite scores of multiple employees with regard to the selected component.

The composite score for a composite is determined based on the analysis of the KPI component scores for each KPI component comprising the composite. This score is determined on a scale from 0-100. In one embodiment, the scale for the composite score is based on the average performance of all employee with regard to the specific component. In one embodiment, the computer system of the present invention receives an input of the scale which should be used for determining the composite score, where certain components are weighted more heavily than others. For example, the user inputs via a user device that the efficiency behavior component should comprise 30% of the overall score while priority alignment should only comprise 15% of the overall composite score. One of ordinary skill in the art will appreciate that there are several viable scoring methods which are known to the art for scoring data on a scale of 0 to 100. These scoring methods disclosed herein are not meant to be an exhaustive enumeration but rather serve to emphasize the function and features of the present invention. The component score is then used to plot a spider graph at a second level of the hierarchy of the fractal visualization of data, referred to herein as a component graph. In one embodiment, spider graphs which are not unit graphs are scored according to the scoring system for a composite graph (i.e., are determined according to the methods disclosed herein with respect to composite graphs).

Figure 4C:
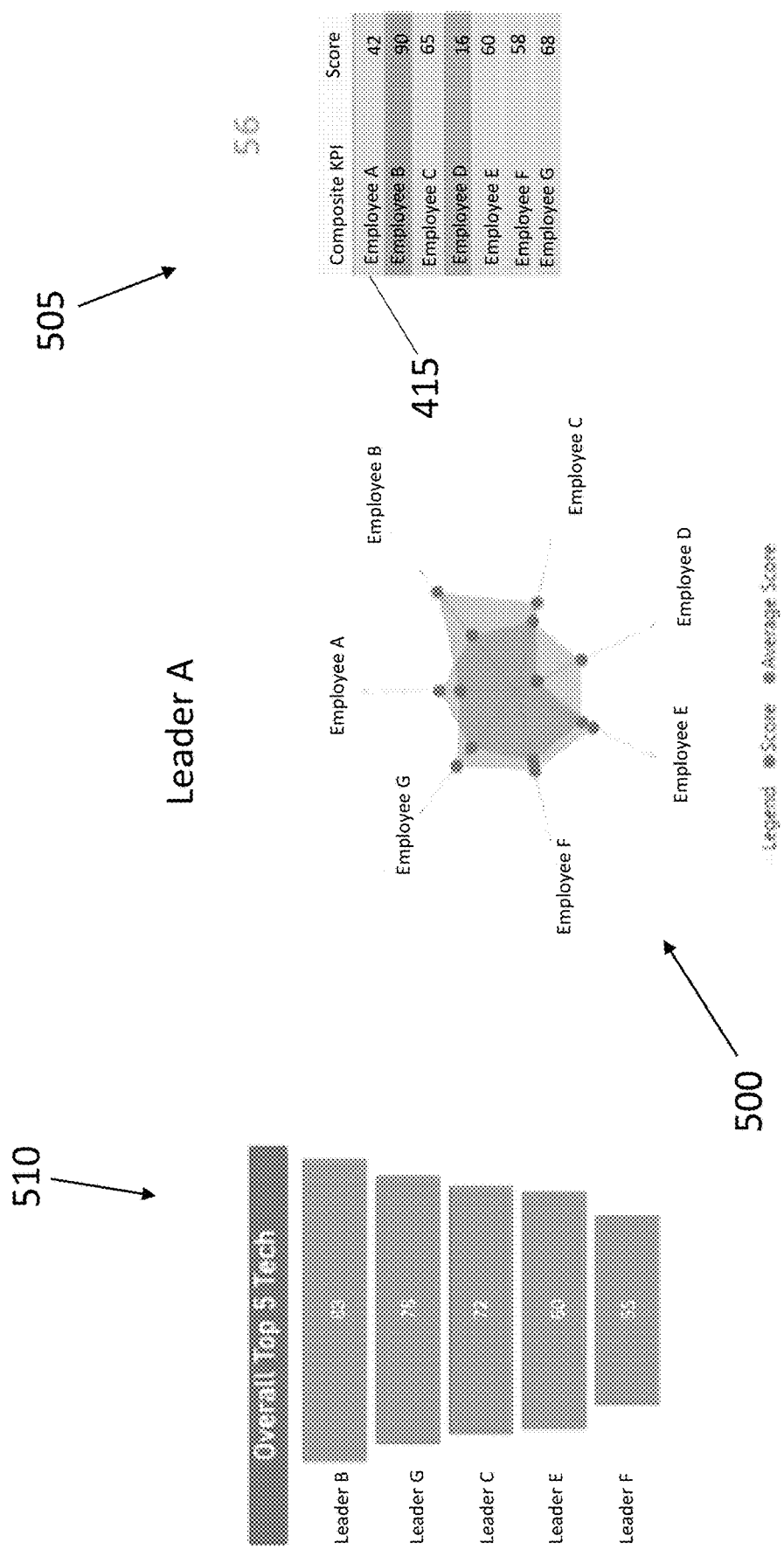
FIG. 4C illustrates a composite spider graph display according to one embodiment of the present invention.

FIG. 4C illustrates a composite display for Leader A according to one embodiment of the present invention. The composite graph display includes a composite graph 500 and a table 505. The table 505 includes the KPI composite scores for each KPI component, as well as the overall score for the performance of Leader A (i.e., the score based on the analysis of multiple composite scores, referred to herein as the effectiveness score). The composite score for the component graph 500 is 56. The KPI composites observed for determining an effectiveness score for Leader A are the composite scores of Employee A, Employee B, Employee C, Employee D, Employee E, Employee F, and Employee G. In one embodiment, the client organization indicates Employee A, Employee B, Employee C, Employee D, Employee E, Employee F, and Employee G to be the composites comprising the effectiveness score for Leader A (i.e., the user for which KPI composites are evaluated and an overall score is determined). The performance comparison chart 510 compares the composite scores of multiple employees with regard to the selected component.

FIGS. 3A-3C depict the fractal nature of the spider graphs of the present invention. FIG. 4A depicts the KPI units which comprise the component, the component being driver behavior which is given an overall component score of 8. FIG. 4B then depicts the incorporation of driver behavior into the overall effectiveness of Employee A. The component score of 8 with regard to driver behavior is incorporated into the composite score for Employee A. The composite score for Employee A is then used to construct the score for Leader A, as depicted in FIG. 4C.

This design advantageously allows a user to visualize the values in which they excel and the values for which they are comparatively underperforming. Further, this allows a company or organization to understand the strengths and weaknesses of each subgroup within the organization. While the example illustrated herein is used in terms of employees of a company incorporating driver behavior into the effectiveness of each employee, the computer system of the present invention is applicable for a variety of settings, including but not limited to the educational field, government bodies, restaurants, online websites, law enforcement agencies, insurance companies, etc. Further, while the example of the present invention utilizes human performance examples (i.e., employee behavior and data related to a specific employee), the present invention is applicable to analyze impersonal data such as menu placement effectiveness and distribution efficiency.

Figure 5:
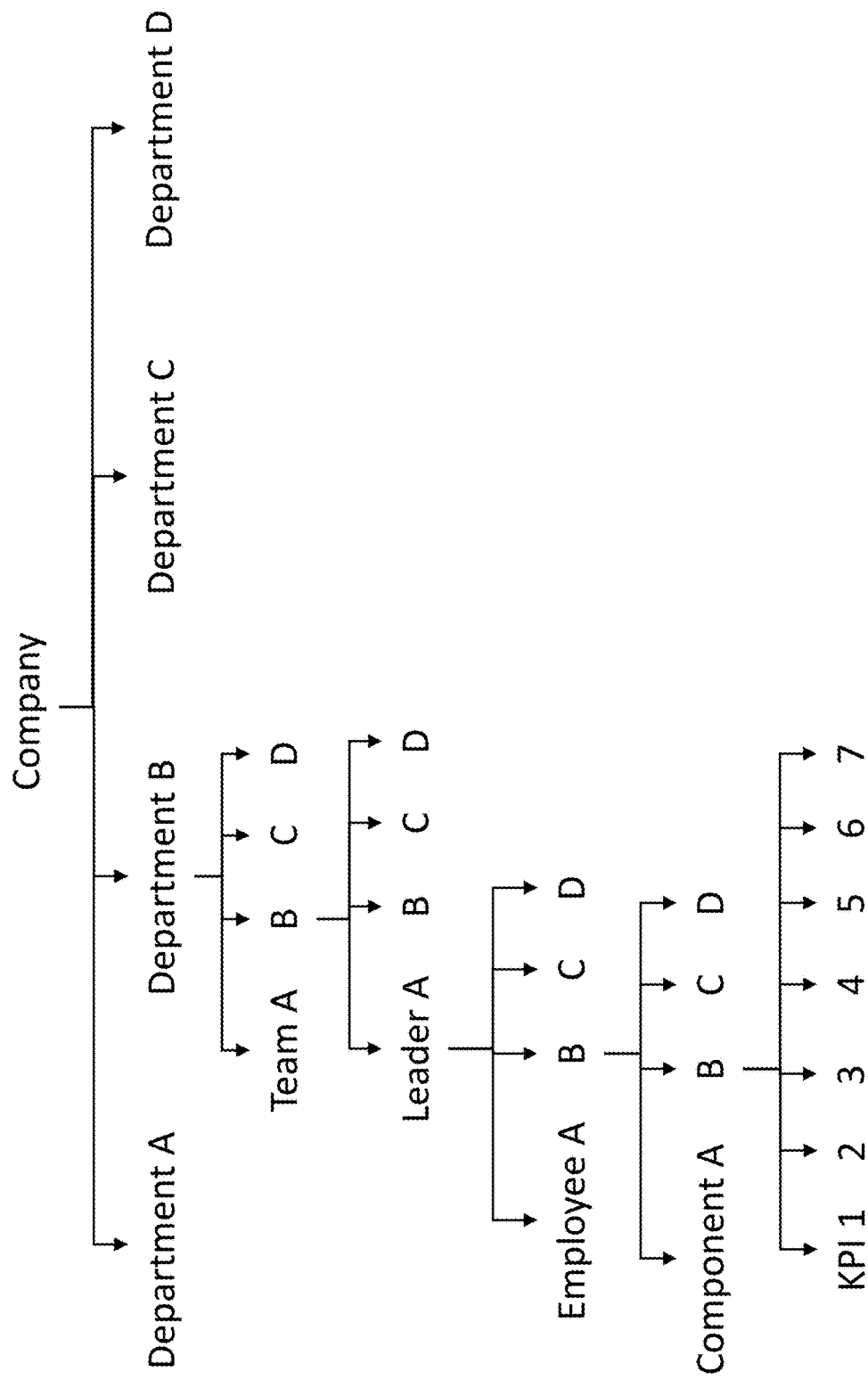
FIG. 5 is a schematic diagram of an exemplary data hierarchy of the present invention.

FIG. 5 is a schematic diagram illustrating an exemplary hierarchy for nested spider graphs according to one embodiment of the present invention. As KPI units cannot be broken down further, the KPI unit is the lowest possible level of the hierarchical spider graph. The term "component" as used herein is used to describe a feature for which a score is comprised of multiple KPI unit scores (e.g., driver behavior). As depicted in FIG. 5, Component B is comprised of the KPI unit scores for each of KPI values 1, 2, 3, 4, 5, 6, and 7. Component B is then compiled with Component A, Component C, and Component D to determine the composite score for Employee B.

This design advantageously allows a user to visualize the values in which they excel and the values for which they are comparatively underperforming. Further, the computer system of the present invention is a technological advancement in the area of performance intelligence, in part because the visualization of data using nested graphs allows for rapid toggling between layers of data, allowing a user to view the information used to populate a graph, then view the impact of the information visualized on that graph by "zooming out" to a higher level view of compiled information from multiple areas (i.e., components and/or composites).

Figure 6:
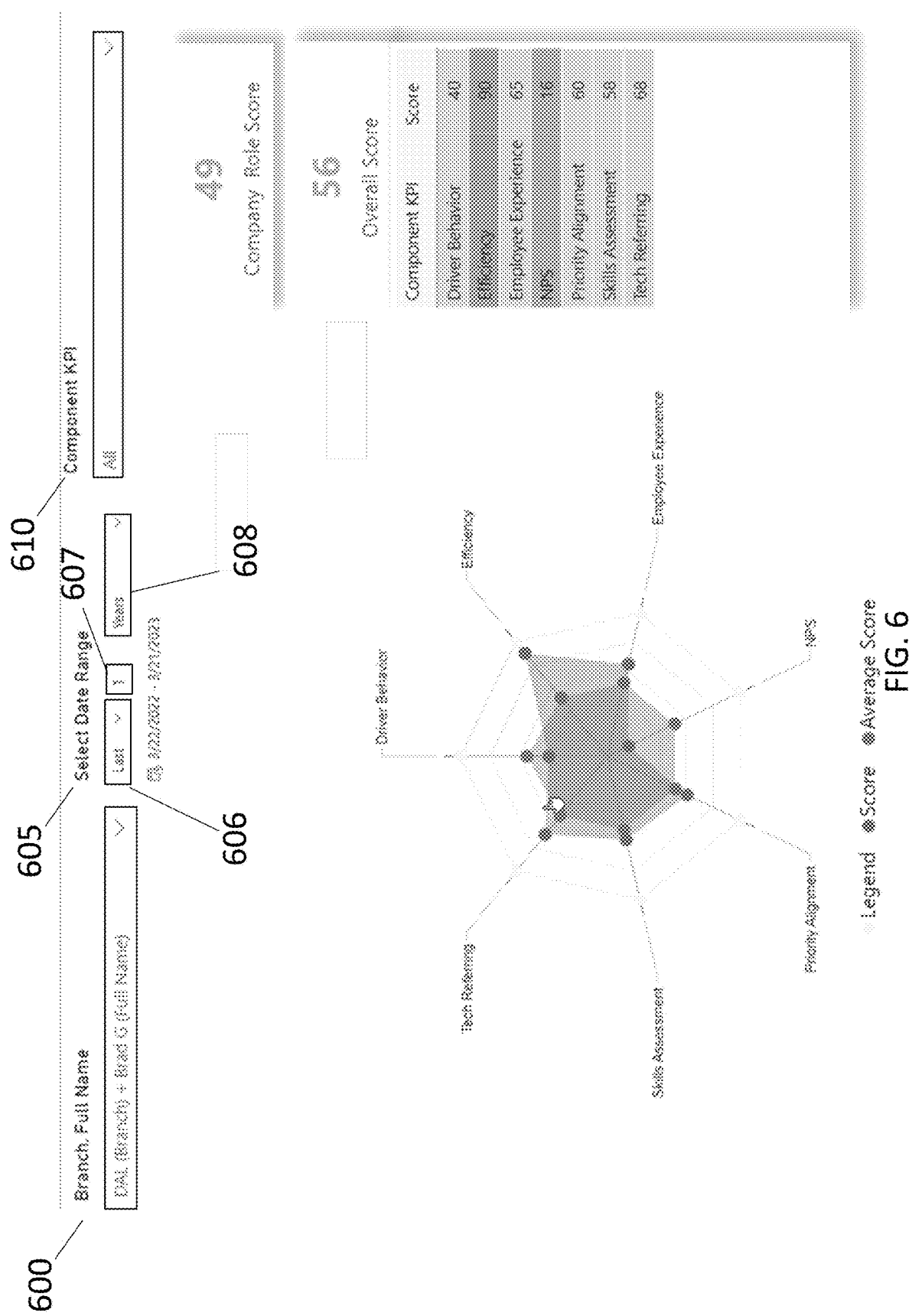
FIG. 6 illustrates a fractal spider graph according to one embodiment of the present invention.

FIG. 6 is an illustration of a component spider graph display according to one embodiment of the present invention. The employee selection menu 600 is a drop down menu comprising a list of employees within each branch of a company. The date range selection 605 is a group of drop down menus and typed input prompts including a relative time indicator 606, a numerical order 607, and a length of time for consideration 608. The component selection menu 610 is a drop down menu comprising a list of the components considered in the spider graph.

In one embodiment, the computer system of the present invention constructs a spider graph display upon receiving a selection of the employee from the employee selection menu. One of ordinary skill in the art will appreciate that the employee selection is used herein for exemplary purposes only and should not serve to limit the understanding of the functionality of the present invention. For example, the selection menu may include a company, a region, a department, a team, a leader, a location, a brand, a Global Positioning System (GPS)-based sector, etc. wherein the data of the spider graph reflects data collected with respect to that value (e.g., police reports from within a specific GPS based sector).

In one embodiment of the present invention, the system updates data in real-time. This allows for the real-time analysis of performance data and thereby enables real-time analysis of the performance of a user associated with the data. In one embodiment, the system receives real-time data. In one embodiment, the real-time data is collected by one or more sensors used by the system. In one embodiment, the computer system of the present invention receives uploaded data from the client to the database of the present invention regularly on a weekly basis. In one embodiment, the computer system of the present invention receives uploaded data from the client to the database of the present invention regularly on a daily basis. In one embodiment, the computer system of the present invention receives uploaded data from the client to the database of the present invention regularly on a bi-weekly basis.

In one embodiment, the system of the present invention evaluates data before and after an event. For example, the system analyzes the productivity of a user before the user attends an instructional seminar on how to increase productivity. This is done by compiling the user data from before the date and time of the seminar and comparing the compiled data to the analysis of the performance of the user after the date and time of the seminar. In one embodiment, a user is able to select a date, time, working shift, event, and/or other temporal indication using a device implementing the system of the present invention. The present invention then analyzes both the data prior to the specified date, time, working shift, event, and/or other temporal indication and the data following the specified date, time, working shift, event, and/or other temporal indication. The system then compares the compiled data representing one or more users to determine the effect of the specified date, time, working shift, event, and/or other temporal indication on the one or more users associated with the data. This allows the system to determine the effect of a specified date, time, working shift, event, and/or other temporal indication on the performance, productivity, efficacy, and/or other data relating to the data generated by the one or more user devices.

One of ordinary skill in the art will appreciate that the evaluation of data based on a selected time range is valuable for more than evaluating performance before and after a specific date. Further, one of ordinary skill in the art will appreciate that the present invention is useful both for examining data relating to human behavior as well as data related to objects and events, such as menu items and insurance incidents (i.e., determining weather related damages).

In one embodiment, the present invention is operable to evaluate performance over time. For example, the present invention is operable to evaluate the performance of an item on a menu over time by evaluating the performance of the item at each quarter. By receiving the sales information of the restaurant overall and comparing the performance of menu item A versus menu items B, C, and D, the present invention is operable to display the comparative performance of menu item A against the average score for sales, performance of other menu items, location within the restaurant where the item was sold (i.e., the bar or the kitchen), the system of the present invention is operable to display and thereby indicate the underperforming menu item at each quarter. Upon identifying and adjusting the location of the menu item, the next quarter evaluated by the system of the present invention displays data showing higher sales results for that item equivalent to the level expected compared to other menu items. In this way, the temporal display of the present invention allows for the visualization of the impact of actions taken to adjust certain data points in order to identify effective measures taken to adjust data points.

In one embodiment of the present invention, the qualitative data associated with a user is determined by natural language processing (NLP) of calls, chats, electronic mail, social media interactions, and/or other communications generated by a user device and/or identified by the user activity tracking software and/or the CRM software. In one embodiment, a component associated with a user is determined by natural language processing of data relating to the user. The natural language processing engine receives an input from one or more data sources and matches the input to a predetermined semantic category. In one embodiment, predetermined semantic categories are stored in the system of the present invention and each word, phrase, or idea included in the received data is matched to one of the predetermined semantic categories based on the context of the word, phrase, or idea, and a calculated relevance to a semantic category. The system of the present invention then evaluates the categories with regard to the KPI unit with which it is associated.

In one embodiment, the system of the present invention includes one or more hash algorithms for obfuscating the data received by the one or more user devices and deposited to the database of the present invention. This advantageously prevents the computer system of the present invention from identifying the exact device for which data should be associated. In this way, data analysis is anonymous. In one embodiment, the one or more user devices used to upload the data to the data base apply a cryptographic hash algorithm to the data before the data is uploaded. When the analysis and visualization is received by the user device, the key for the hash algorithm is used to view the unobstructed data associated with each user device. In one embodiment, any device which does not have access to the key algorithm cannot view the data. In one embodiment, a device which does not have access to the key algorithm can view the data, but the data does not include an indication of the device, user, department, and/or location from which the data was generated.

Figure 7:
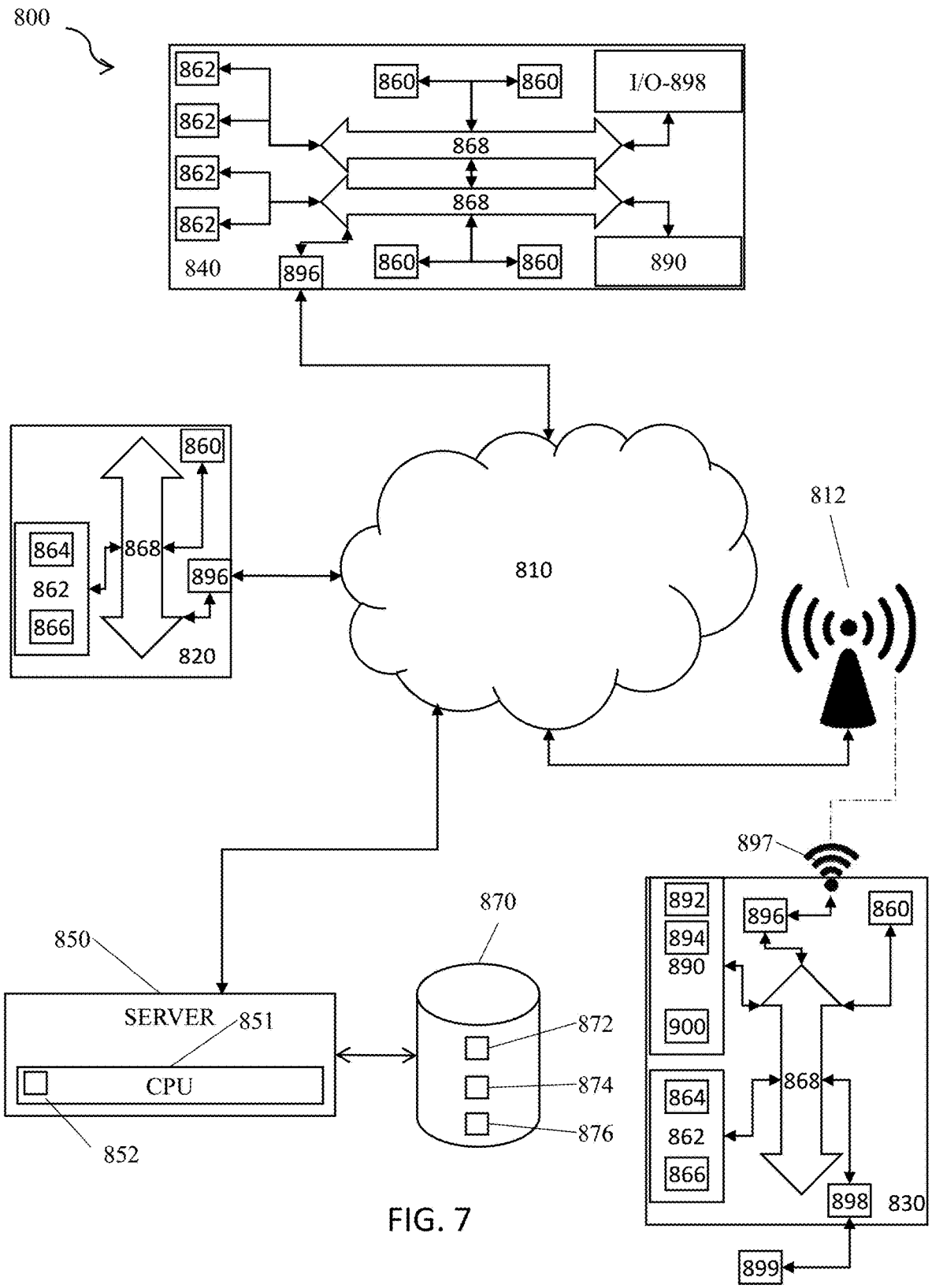
FIG. 7 is a schematic diagram of a system of the present invention.

FIG. 7 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 6, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6, or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for fractal visualization of qualitative data and quantitative data, comprising:
a plurality of client devices;
a database;
a key performance indicator (KPI) catalog;
an analytics engine; and
a user device;
wherein the plurality of client devices collects and compiles data;
wherein the data includes qualitative data and quantitative data;
wherein the KPI catalog uses natural language processing (NLP) and machine learning to identify at least one KPI value within the data;
wherein the NLP and the machine learning are operable to construct a textual narrative based on the data;
wherein the database is operable to receive and store data from the plurality of client devices;
wherein the analytics engine retrieves the data from the database, converts the data into KPI units, and compiles the KPI units into a unit spider graph visualization;
wherein the unit spider graph visualization is compiled into a component spider graph visualization, wherein the component spider graph visualization is comprised of KPI components, wherein the KPI components represent a compilation of the KPI units;
wherein the component spider graph visualization is compiled into a composite spider graph visualization, wherein the composite spider graph visualization is comprised of KPI composites, wherein the KPI composites represent a compilation of the KPI components;
wherein the user device displays the composite spider graph visualization using a graphical user interface (GUI);
wherein the GUI is operable to restructure the displayed composite spider graph visualization to the component spider graph visualization for a desired KPI composite;
wherein the GUI is operable to restructure the displayed component spider graph visualization to the unit spider graph visualization for a desired KPI component; and
wherein the GUI is operable to toggle among the composite spider graph visualization, the component spider graph visualization, and the unit spider graph visualization.

2. The system of claim 1, wherein the qualitative data is operable to be evaluated with the NLP before the database receives the qualitative data.

3. The system of claim 1, wherein the KPI catalog receives an input from at least one of the plurality of client devices, wherein the input includes the at least one KPI value to be quantified from the data, wherein the KPI catalog produces a schema, and wherein the schema is a categorization of the at least one KPI value.

4. The system of claim 1, wherein at least one sensor is attached to at least one of the plurality of client devices, wherein the at least one sensor collects the data, and wherein the collection occurs in real-time.

5. The system of claim 1, wherein the GUI is operable to restructure the displayed component spider graph visualization of the desired KPI composite to another desired KPI composite.

6. The system of claim 1, wherein the data is updated in real-time, wherein the analytics engine is operable to perform real-time analysis.

7. The system of claim 1, wherein at least one of the plurality of client devices applies a cryptographic hash algorithm to the data before sending the data to the database.

8. A method for fractal visualization of qualitative data and quantitative data, comprising:
a plurality of client devices obtaining and compiling data, wherein the data includes qualitative and quantitative data;
sending the data to a database;
retrieving the data to convert into key performance indicator (KPI) units;
identifying at least one KPI value using natural language processing (NLP) and machine learning from a KPI catalog, wherein the NLP and the machine learning construct a textual narrative based on the data;
compiling the KPI units into a unit spider graph visualization;
compiling the unit spider graph visualization into a component spider graph visualization, wherein the component spider graph visualization is comprised of KPI components, wherein the KPI components represent a compilation of the KPI units;
compiling the component spider graph visualization into a composite spider graph visualization, wherein the composite spider graph visualization is comprised of KPI composites, wherein the KPI composites represent a compilation of the KPI components;

displaying a spider graph visualization through a graphical user interface (GUI); and restructuring the displayed spider graph visualization to a desired view, wherein the desired view is the composite spider graph visualization, component spider graph visualization, or the unit spider graph visualization, and wherein the desired view is based on a user input of a desired KPI element, wherein a desired KPI element is comprised of KPI units, KPI components, and KPI composites.

9. The method of claim 8, further comprising the KPI catalog receiving, evaluating, converting, and transmitting the data from at least one of the plurality of client devices to the database.

10. The method of claim 8, wherein the KPI catalog is configured to receive the data according to a predetermined schema.

11. The method of claim 8, further comprising determining a legend for the displayed spider graph visualization, wherein the displayed spider graph visualization is the composite spider graph visualization, by evaluating a highest score based on the KPI composites.

12. The method of claim 8, further comprising quantifying the KPI units into KPI unit scores, wherein the KPI unit scores are based on a 0 to 100 scale.

13. The method of claim 8, further comprising storing the data in a cloud platform.

14. The method of claim 8, further comprising converting the data into a data table including identified schema using a CSV conversion software.

15. A system for fractal visualization of qualitative data and quantitative data, comprising:
- a plurality of client devices;
- a database;
- a key performance indicator (KPI) catalog;
- an analytics engine; and
- a user device;
- wherein at least one of the plurality of client devices obtains data;
- wherein the at least one of the plurality of client devices uploads the data to the database;
- wherein the KPI catalog uses natural language processing (NLP) and machine learning to identify at least one KPI value within the data;
- wherein the NLP and the machine learning are operable to construct a textual narrative based on the data;
- wherein the analytics engine retrieves the data from the database, converts the data into KPI units, and compiles the KPI units into a unit spider graph visualization;
- wherein the unit spider graph visualization is compiled into a component spider graph visualization, wherein the component spider graph visualization is comprised of KPI components, wherein the KPI components represent a compilation of the KPI units;
- wherein the component spider graph visualization is compiled into a composite spider graph visualization, wherein the composite spider graph visualization is comprised of KPI composites, wherein the KPI composites represent a compilation of the KPI components;
- wherein the user device displays the composite spider graph visualization using a graphical user interface (GUI);
- wherein the GUI is operable to restructure the displayed composite spider graph visualization to the component spider graph visualization for a desired KPI composite;
- wherein the GUI is operable to restructure the displayed component spider graph visualization to the unit spider graph visualization for a desired KPI component; and
- wherein the GUI is operable to among the composite spider graph visualization, the component spider graph visualization, and the unit spider graph visualization.

16. The computer system of claim 15, wherein the database is operable to receive a transmission of one or more qualitative data types.

17. The computer system of claim 15, wherein the at least one of the plurality of client devices includes a sensor, wherein the sensor uploads the data directly to the database.

18. The computer system of claim 15, wherein the KPI catalog is configured to receive the data according to a predetermined schema.

19. The computer system of claim 15, wherein the data is uploaded via wireless network connection.

20. The computer system of claim 15, wherein the GUI is operable to restructure the displayed unit spider graph visualization of the desired KPI component to another desired KPI component.

* * * * *